Nov. 22, 1927.
A. R. NEELANDS
1,649,846
SEALING OR FIXING OF CASING TUBES IN BORE HOLES, WELLS, OR THE LIKE
Filed Feb. 8, 1926
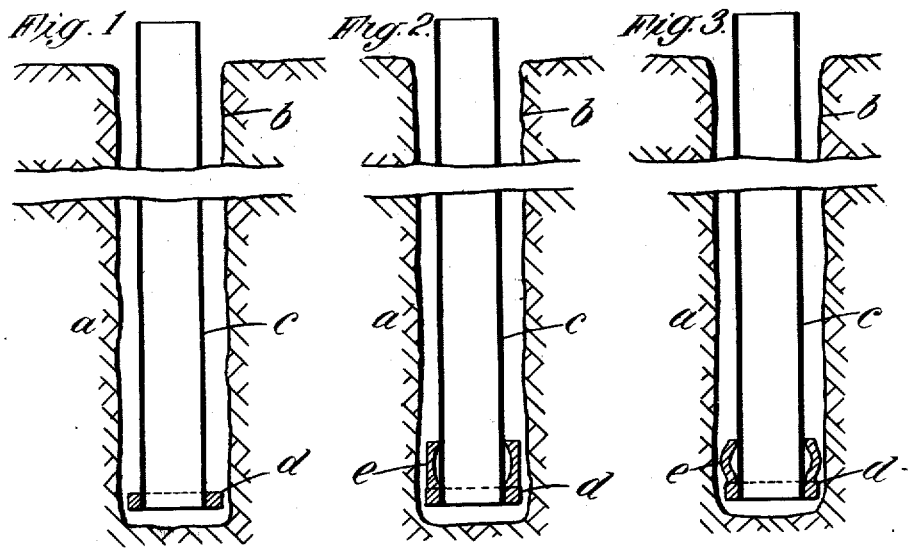
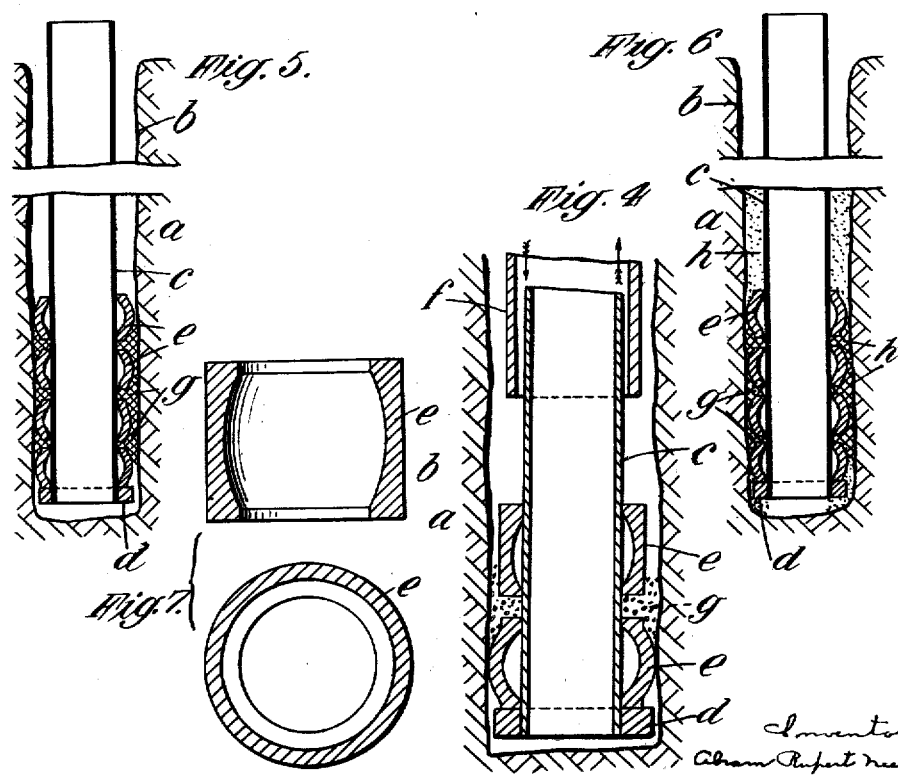

Patented Nov. 22, 1927.

1,649,846

UNITED STATES PATENT OFFICE.

ABRAM RUPERT NEELANDS, OF DONCASTER, ENGLAND, ASSIGNOR TO THE FRANCOIS CEMENTATION COMPANY, LIMITED, OF LONDON, ENGLAND, A BRITISH COMPANY.

SEALING OR FIXING OF CASING TUBES IN BORE HOLES, WELLS, OR THE LIKE.

Application filed February 8, 1926, Serial No. 86,707, and in Great Britain June 5, 1925.

This invention relates to the sealing or fixing of casing tubes in bore holes, wells or the like.

Attempts have previously been made to seal the metal linings or casing tubes of bore holes or wells in such a manner as to render the same watertight and sufficiently strong to withstand high pressures, but all such previously proposed methods possess the following practical defects:—

(1) In broken or fissured ground the casing tube cannot be rendered watertight without a very high consumption of cement grout, while the strength of the seal is never sufficient to withstand the pressure to which the casing tube is often submitted.

(2) A considerable time elapses before the cement grout used in the sealing operation is sufficiently hard and set to be effective.

According to the present invention these and other defects are obviated by the use of metallic packing which is inserted in any required quantity, according to the particular case that is being dealt with, between the casing tube itself and the ground or bore hole within which the casing tube is to be sealed. The casing tube may be of cylindrical form and provided externally at its lower end with a base ring of suitable dimensions which is screwed or otherwise fastened to the casing tube. The metallic packing may be constituted by metal rings composed of lead or other suitable material, which are of larger diameter than the casing tube so that they can slide freely thereon. The said rings are adapted to be successively dropped into position around the casing tube and thereafter by an energetic ramming operation, by compression, or otherwise, they are expanded laterally or deformed so as to fill the space between the casing tube and the wall of the bore hole within which the casing tube is located. Packing material composed of a soft material such as lead wool, hemp, etc., may be located around the casing tube and rammed in place in a similar manner to the metallic packing rings, said soft material being located between each successive metallic ring. When the casing is tightly sealed within the bore hole, cement grout is introduced freely into the casing tube and, on pressure being applied thereto, the cement grout is forced to percolate or filter under pressure from the casing through the expanded packing rings, as also through the soft packing material inserted between the rings in cases where such soft packing is provided. As soon as the cement grout is set the sealing of the casing tube is complete and, on account of the aforesaid metallic packing rings, the soft packing insertions located between the same, and the fact that the rings have been expanded into position under pressure through the expanded packgrout has been caused to filter or percolate under pressure through the expanded packing rings and the soft packing insertions which offer considerable resistance to such percolation or filtration, the cement grout sets quickly and a perfectly watertight seal, strong enough to withstand any pressure, is obtained.

In order that the said invention may be clearly understood and readily carried into effect the same will now be described more fully with reference to the accompanying drawing, in which:—

Figure 1 is a vertical section showing a casing tube in position within a bore hole or well, the bore hole or well having previously been prepared to receive the casing tube and the tube being fitted externally of its lower end with a base ring.

Figure 2 is a vertical section showing the first metallic packing ring located around the casing tube prior to the lateral expansion of the said ring.

Figure 3 is a vertical section corresponding to Figure 2 and showing the packing ring after it has been expanded laterally.

Figure 4 is a vertical section on a larger scale, showing one type of metallic packing ring, combined with packing material prior to and after the expansion of the packing rings.

Figure 5 is a vertical section showing a number of expanded packing rings in position and alternating with packing material insertions, the seal being now ready to receive the grouting.

Figure 6 is a vertical section showing the completed seal after the injection of cement grout through the packing and round the casing tube.

Figure 7 is a vertical and a horizontal section respectively of a suitable type of metallic packing ring.

*a* denotes the ground of any nature in which the bore hole or well is drilled, and *b* denotes the bore hole or well. *c* is the casing tube which is of a suitable external diameter to permit the casing to be inserted freely into the bore hole or well $b$. $d$ is the metallic base ring of suitable dimensions, which is screwed onto and fastened to the inner end of the casing tube $c$.

After the casing tube $c$, fitted with the base ring $d$, has been placed in the bore hole or well, as in Figure 1, the first expanding packing ring $e$ is placed around the casing tube $c$ and dropped into the bore hole (Figure 2) where it is retained in place on the tube $c$ by the base ring $d$. This expanding packing ring $e$ is as aforesaid made of lead or other suitable material, and may be shaped, as shewn on a larger scale at Figure 7, in order that, when submitted to energetic ramming, it may expand laterally. The first packing ring $e$ is then caused to expand by means of an energetic ramming operation carried out by the driving up and down of a suitable tool, such for example as a steel tube $f$ (Figure 4) of an internal diameter sufficient to enable it to be located around the casing tube $c$. After the first packing ring $e$ has been rammed in place and expanded as shown in Figure 3, the soft malleable packing $g$, is inserted around the tube $c$ and rammed in place in the same way as the expanded packing ring $e$. A second expanding packing ring $e$ is then inserted around the casing tube $c$ and rammed and expanded in the same way as the first ring. The second packing ring is followed by an insertion of soft packing material $g$ as previously described, and the sealing is continued and completed by the necessary number of alternating rings and packing insertions, until a sufficient grip is realized for the pressure which is to be withstood in each particular case. As soon as the casing tube $c$ has been fixed in the bore hole or well, as above described, a suitable quantity of liquid cement, cement mortar or grout of any suitable kind is poured or located within the casing tube and on pressure being applied thereto the cement grout is forced from the casing tube and caused to filter or percolate under pressure through the system of expanded packing rings and soft packing material until a sufficient quantity of grout has been injected to result, when the grout is set and hard, in a perfectly watertight seal.

What I claim and desire to secure by Letters Patent of the United States is:—

1. A method of sealing a metallic casing tube in position within a bore hole which consists in locating the casing tube in position, thereafter positioning metallic packing rings around the casing tube between the casing tube and the ground, expanding the same laterally and thereafter introducing a setting material into the casing tube and causing the same to percolate from the casing tube through the expanded metallic packing rings.

2. A method of sealing a metallic casing tube in position within a bore hole as claimed in claim 1 in which insertions of soft packing material are introduced alternately with each metallic expanded packing ring.

A. R. NEELANDS.

ing tube which is of a suitable external diameter to permit the casing to be inserted freely into the bore hole or well $b$. $d$ is the metallic base ring of suitable dimensions, which is screwed onto and fastened to the inner end of the casing tube $c$.

After the casing tube $c$, fitted with the base ring $d$, has been placed in the bore hole or well, as in Figure 1, the first expanding packing ring $e$ is placed around the casing tube $c$ and dropped into the bore hole (Figure 2) where it is retained in place on the tube $c$ by the base ring $d$. This expanding packing ring $e$ is as aforesaid made of lead or other suitable material, and may be shaped, as shewn on a larger scale at Figure 7, in order that, when submitted to energetic ramming, it may expand laterally. The first packing ring $e$ is then caused to expand by means of an energetic ramming operation carried out by the driving up and down of a suitable tool, such for example as a steel tube $f$ (Figure 4) of an internal diameter sufficient to enable it to be located around the casing tube $c$. After the first packing ring $e$ has been rammed in place and expanded as shown in Figure 3, the soft malleable packing $g$, is inserted around the tube $c$ and rammed in place in the same way as the expanded packing ring $e$. A second expanding packing ring $e$ is then inserted around the casing tube $c$ and rammed and expanded in the same way as the first ring. The second packing ring is followed by an insertion of soft packing material $g$ as previously described, and the sealing is continued and completed by the necessary number of alternating rings and packing insertions, until a sufficient grip is realized for the pressure which is to be withstood in each particular case. As soon as the casing tube $c$ has been fixed in the bore hole or well, as above described, a suitable quantity of liquid cement, cement mortar or grout of any suitable kind is poured or located within the casing tube and on pressure being applied thereto the cement grout is forced from the casing tube and caused to filter or percolate under pressure through the system of expanded packing rings and soft packing material until a sufficient quantity of grout has been injected to result, when the grout is set and hard, in a perfectly watertight seal.

What I claim and desire to secure by Letters Patent of the United States is:—

1. A method of sealing a metallic casing tube in position within a bore hole which consists in locating the casing tube in position, thereafter positioning metallic packing rings around the casing tube between the casing tube and the ground, expanding the same laterally and thereafter introducing a setting material into the casing tube and causing the same to percolate from the casing tube through the expanded metallic packing rings.

2. A method of sealing a metallic casing tube in position within a bore hole as claimed in claim 1 in which insertions of soft packing material are introduced alternately with each metallic expanded packing ring.

A. R. NEELANDS.

Certificate of Correction.

Patent No. 1,649,846.  Granted November 22, 1927, to

ABRAM RUPERT NEELANDS.

It is hereby certified that error appears in the printed specification of the above-numbered patent requiring correction as follows: Page 1, line 64, strike out the words and syllable "through the expanded pack-" and insert instead *as also the fact that cement;* and that the said Letters Patent should be read with this correction therein that the same may conform to the record of the case in the Patent Office.

Signed and sealed this 17th day of January, A. D. 1928.

[SEAL.]
M. J. MOORE,
*Acting Commissioner of Patents.*

Certificate of Correction.

Patent No. 1,649,846.                                    Granted November 22, 1927, to

ABRAM RUPERT NEELANDS.

It is hereby certified that error appears in the printed specification of the above-numbered patent requiring correction as follows: Page 1, line 64, strike out the words and syllable "through the expanded pack-" and insert instead *as also the fact that cement;* and that the said Letters Patent should be read with this correction therein that the same may conform to the record of the case in the Patent Office.

Signed and sealed this 17th day of January, A. D. 1928.

[SEAL.]
M. J. MOORE,
*Acting Commissioner of Patents.*